July 1, 1958

G. F. ROUSH 2,841,017

GYRO ERECTION SYSTEM

Filed June 9, 1953

INVENTOR.
GUY FRANKLIN ROUSH
BY
ATTORNEY

July 1, 1958     G. F. ROUSH     2,841,017
GYRO ERECTION SYSTEM

Filed June 9, 1953     2 Sheets-Sheet 2

INVENTOR.
GUY FRANKLIN ROUSH
BY James M. Nickels
ATTORNEY

United States Patent Office 2,841,017
Patented July 1, 1958

2,841,017

GYRO ERECTION SYSTEM

Guy Franklin Roush, Montclair, N. J., assignor to Bendix Aviation Corporation, Teterboro, N. J., a corporation of Delaware Application June 9, 1953, Serial No. 360,529

14 Claims. (Cl. 74—5.7)

This invention relates to artificial horizon gyroscopes and more particularly to devices for erecting and maintaining the spin axis of the gyroscope in a vertical position.

An object of the present invention is to provide an electrical erection system in which the departure of the gyroscope spin axis form its normal vertical positon provides a displacement signal which controls the operation of motors to provide an erection torque to the gimbal of the gyroscope.

Another object of the invention is to provide an erection system for a gyro-vertical of the general character indicated, in which a displacement signal is provided by the change in reluctance of an inductive element mounted over the spin axis of the gyroscope.

Another object of the invention is to provide an electrical erection system for a gyro-vertical of the character indicated in which the departure of the spin axis of the gyroscope from a vertical position will set a suspended ball in motion to provide the displacement signal necessary for the subsequent erection of the spin axis to its vertical position.

Another object of the invention is to provide a novel erection system for a gyro-vertical in which movement of a ball suspended in a frictionless manner provides a displacement signal necessary for the subsequent erection of the spin axis to its vertical position.

Another object of the invention is to provide an improved system for applying an erecting torque to the gimbals of the gyroscope.

Another object of the invention is to provide an improved system for erecting a gyroscope in which power is applied to the erection motors only upon displacement of the spin axis from a predetermined attitude.

Another object of the invention is to provide an erection system for a vertical gyroscope in which the erection rate changes.

The above and other objects and features of the invention will appear more fully hereinafter from a consideration of the following description taken in connection with the accompanying drawings wherein one embodiment of the invention is illustrated by way of example.

Figure 1:
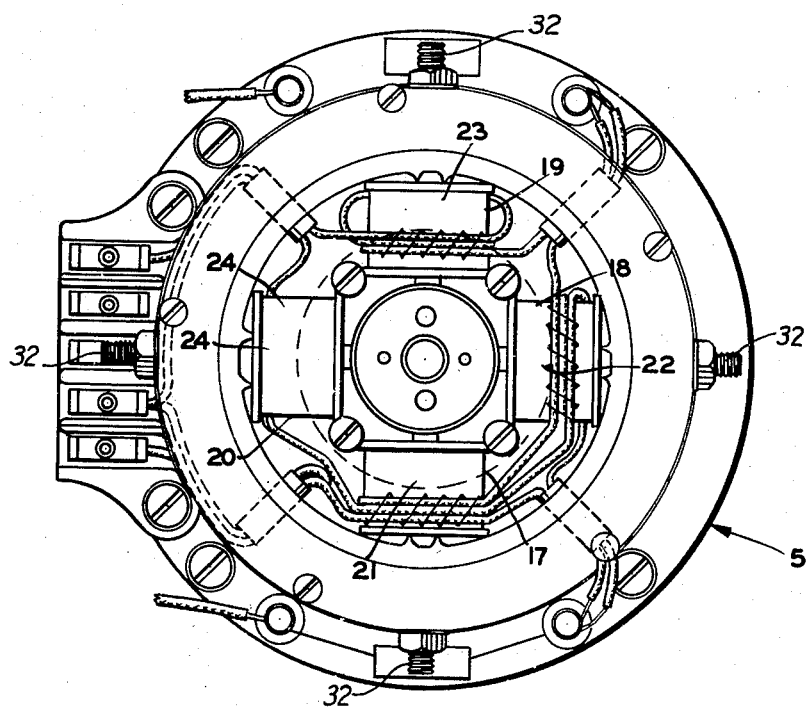
Fig. 1 is a top view of an erecting device embodying the invention.
Figure 2:
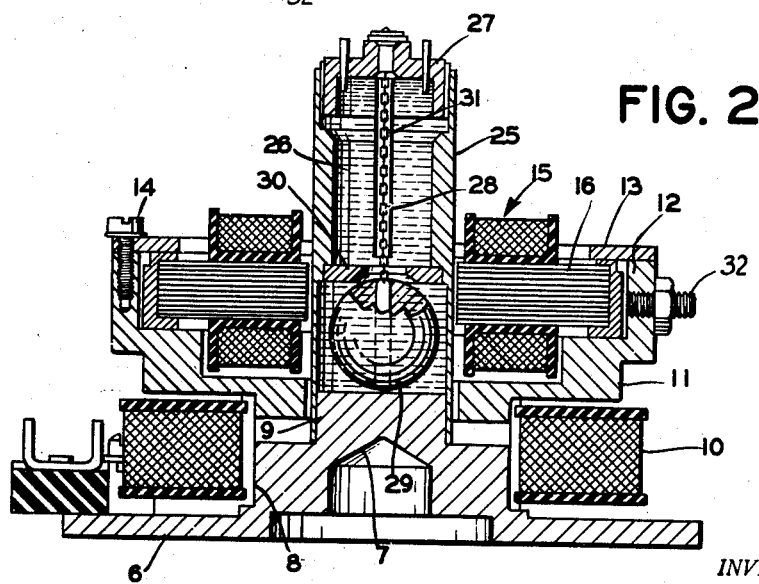
Fig. 2 is a cross-section view of the device illustrated in Fig. 1.

Referring now to Figs. 1 and 2, the numeral 5 designates an erecting system embodying the invention and is adapted to be mounted on the gyro-casing (not shown). The gyro may be of a type illustrated and described in Noxon et al. Patent No. 2,553,268.

The device 5 is mounted on a base plate 6 which is adapted to be mounted on a gyro-casing in a conventional manner. The base plate 6 is provided with a centrally disposed raised section 7 formed with two offsets 8 and 9. Fixed onto the offset 8 and on the base plate 6 is an annular winding 10 encompassing the raised section 7. The winding 10 will hereinafter be referred to as the primary or energizing winding 10. Supporting the winding 10 is an annular supporting plate 11 formed with a centrally disposed opening and provided with an upturned flange 12. A supporting ring 13 is secured to the flange 12 by screws 14.

Supported in the ring 13 is coil and core assembly 15. The assembly 15 comprises stacked ring laminations 16 formed with four inwardly extended radial sections to provide pole pieces 17, 18, 19 and 20 respectively. Wound about each of the pole pieces are coil windings 21, 22, 23, and 24 respectively. For purposes hereinafter appearing, the diagramatically opposite coils 21 and 23 and the coils 22 and 24 are oppositely wound and are interconnected in pairs.

It will be noted that the poles of the assembly coincide with the major and minor trunnion axes of the gyro-vertical. The coils 21, 22, 23 and 24 will hereinafter be referred to as the secondary windings or pickup coils.

Supported on the section 7 is a casing 25 adapted to contain fluid 26. Suspended from a cap portion 27 of the casing 25 is a chain 28 suspending a ball 29. A divider 30 is provided in the casing 25 to eliminate the upward movement of the ball 29. The divider 30 also limits the swing movement of the ball 29. A tube 31 is placed over the chain 28 for the purpose of preventing kinking thereof.

Adjusting screws 32 may be provided for adjusting the pole pieces 17, 18, 19 and 20 respectively to balance the outputs of the windings 21, 22, 23, and 24 when the gyro axis is in the vertical position.

Resistors 33 (see Figure 3) may be connected in shunt with either coil of any pair of secondary windings to provide a minor phase shift producing a sharp null.

In operation, upon the spin axis of the gyro-vertical being in its vertical position the ball 29 will be suspended equidistant between the secondary windings 21, 22, 23 and 24. The secondary windings being serially connected in opposition, the voltage induced in each pair of windings will cancel with the result that no displacement or error signal will result. However, upon departure of the spin axis from its vertical position the ball will swing toward one of the secondary windings, depending upon the direction of departure, thereby changing the reluctance of the magnetic paths between primary winding 10 and the secondary windings 21, 22, 23 and 24. The voltages induced in the secondary winding will not be equal, due to the change in reluctance of the magnetic paths, and will produce an output in accordance with the displacement from the vertical position.

Figure 3:
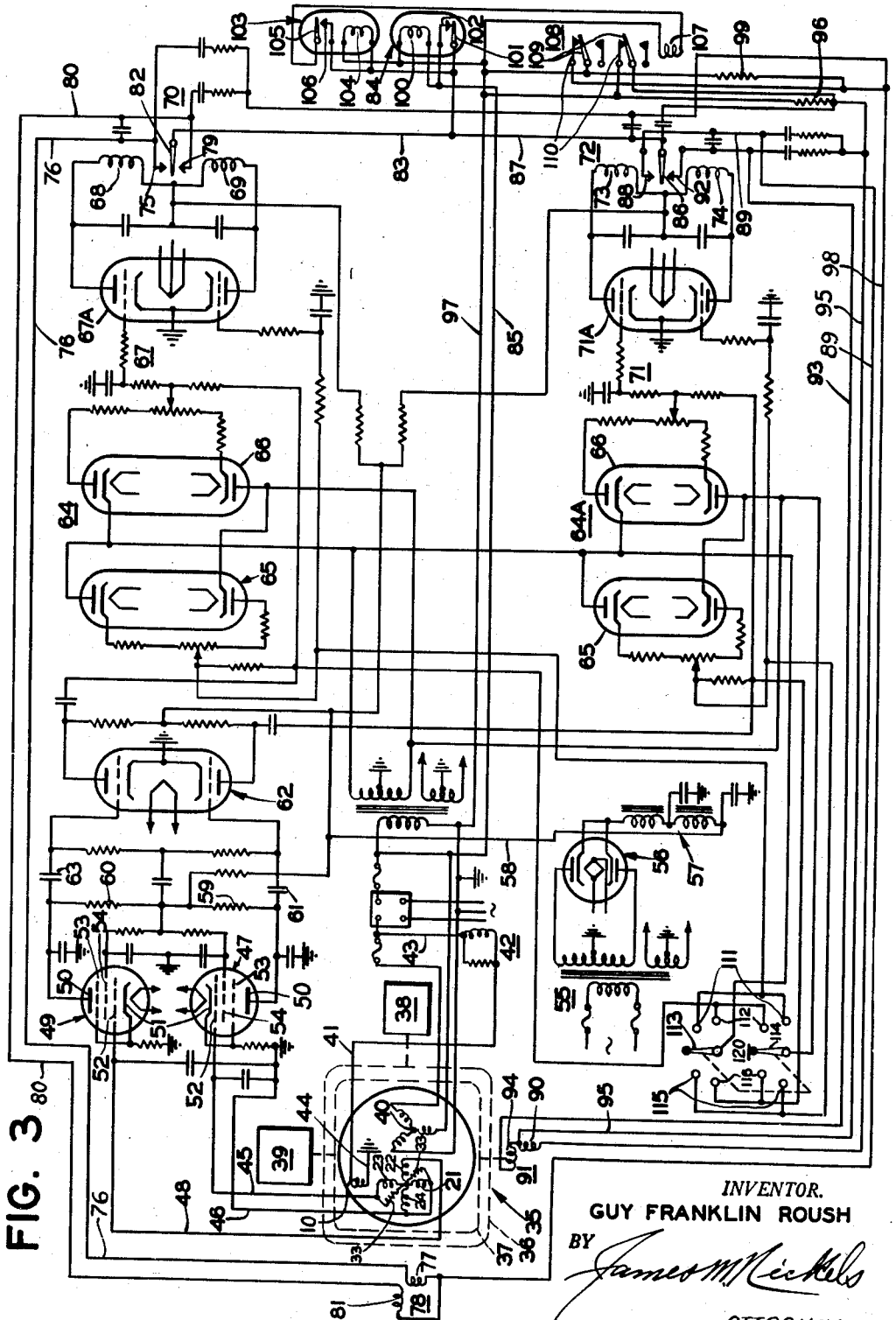
Fig. 3 is a wiring schematic diagram of the erection system.

Referring now to Fig. 3 wherein the device illustrated in Fig. 1 is incorporated into an erection system, a gyro 35 is illustrated diagrammatically and has an outer gimbal 36 and inner gimbal 37. The conventional pick-offs 38 and 39 are connected to the respective gimbals. Excitation of rotor windings 40 for the gyroscope 35 is obtained from the conventional A. C. source (ont shown). The primary winding 10 is connected across the A. C. source by conductors 41, phase shift network 42, conductor 43 and ground connection 44. The secondary windings 21, 22, 23 and 24 are connected in pairs in series opposition and it is assumed that they are positioned relative to the ball 29, as illustrated in Fig. 2. Windings 21 and 23 are connected by conductors 45 and 46 across the input of an amplifier tube 47. The windings 22 and 24 are connected by conductors 48 and 46, across the input of the amplifier tube 49.

The amplifier tubes 47 and 49 are similar pentodes as shown, and include anodes 50 and cathodes 51, control grids 52 and suppressor and screen grids 53 and 54. Anode voltage is supplied from a transformer 55 connected to a source of alternating current (not shown), through rectifier 56, filter network 57, conductor 58 and resistors 59 and 60. The output of the amplifier tube 47 is connected through capacitor 61 to one section of duplex amplifier tube 62. The output of the amplifier 49 is connected through capacitor 63 to the other half of the amplifier tube 62.

The outputs from the two sections of the amplifier tube 62 are connected to respective discriminative circuits 64 and 64A. The discriminative circuits or discriminators 64 and 64A are substantially identical and each comprises duplex electron discharge tubes 65 and 66. Each of the discriminators 64 and 64A remove the out of phase fundamental along with the harmonic of the fundamental and develops a D. C. voltage whose polarity is phase conscious and whose amplitude is proportional to the amplitude of the signal feeding into the input of the discriminator. The two outputs of each discriminator are always of opposite polarity. The output of the discriminator 64 is connected through integrator circuit 67, amplifier 67A to control windings 68 and 69 of a normally balanced stable center polarized relay 70. Inasmuch as the two outputs of the discriminator are always of opposite polarity, the relay 70 will be energized either way depending upon the polarity of the D. C. signal voltage. When in the unenergized condition the relay 70 will return to its center position.

The outputs of the discriminator 64A are connected through a similar integrator 71, amplifier 71A to a normally balanced stable center polarized relay 72. The relay 72 has control windings 73 and 74 so that the relay 72 will be energized either way depending on the polarity of the D. C. signal voltage.

One contact 75 of the relay 70 is connected through conductor 76 to one winding 77 of an erection motor 78. The other contact 79 of the relay 70 is connected by a conductor 80 to a phase winding 81 of the motor 78. The armature 82 of the relay 70 is connected by conductor 83, thermal time delay relay 84 and conductor 85 to the source of electrical energy.

The armature member 86 of the relay 72 is connected by conductor 87, the time delay thermal relay 84 and conductor 85 to the source of electrical energy. Contact 88 of the relay 72 is connected by conductor 89 to one phase winding 90 of an erection motor 91. Contact 92 of the relay 72 is connected by conductor 93 to another phase winding 94 of the motor 91. The windings 90 and 94 are connected by a conductor 95, resistor 96 and conductor 97 to the energy source to complete the circuit.

The windings 77 and 81 of the motor 78 are connected by conductor 98 and resistor 99 to the conductor 97 thereby completing the circuit for the motor 78.

The thermal time delay relay 84 has a control winding 100 adapted to control armature 101, armature contact 102 to provide a time delay upon energization of the system sufficient to permit the gyroscope to come up to a speed of approximately several thousand R. P. M. before closing armature 101 and contact 102 for applying erection torque. The thermal time delay relay 84 also upon closing armature 101 and contact 102 energizes a thermal time delay relay 103 which has control winding 104 adapted to control armature 105 and associate contact 106, which are normally open. Upon energization, the winding 104 of the time delay relay 103, after a predetermined time delay, closes the armature 105 and contact 106. The time delay relay 103 controls a winding 107 of relay 108. The relay 108 has a pair of armature members 109 and associated contacts 110 which when in the closed normal position shunt out the respective resistors 99 and 96, thus applying full power to the erection motors 78 and 91, until the winding 107 is energized by the closing of contact 106 by armature 105 of relay 103 after the predetermined time delay so as to cause the armature members 109 to open the contacts 110 and remove the shunt from the resistors 96 and 99 whereupon the erection motors 78 and 91 are driven at a slower and normal rate.

The operation of the system is started by applying power which will energize gyro motor rotor winding 40 to start the gyro spinning. The thermal time delay relay 84 prevents erection torque from being applied until the gyroscope has reached a predetermined speed. The resistors 96 and 99 are thereafter shunted by the relay 108 as controlled by the thermal time delay relay 103 thus permitting full power to be applied to the erection motors 78 and 91. After a predetermined time delay the shunt is removed from the resistors 96 and 99 and a slow or normal rate of erection is obtained.

Upon the gyro spin axis departing from the vertical a signal is obtained depending upon the direction of departure and is fed through one of the channels to energize one or the other or both of the two relays 70 and 72 in a direction to energize one or both of the gyro motors to apply torque at 90 degrees from the direction of departure in order to bring the gyroscope back to the vertical position.

In some cases it is desirable to impose an artificial signal of given phase to the input of the discriminating circuit so that the relays may be energized either way to drive the gyro off vertical; and by noting the amplitude of the signal in the plane in which the gyroscope is being driven off vertical, the time required for the gyroscope to return to its vertical (being driven off a predetermined number of degrees) will give the erection rate of the gyro in that plane. Switch 120 is provided for connecting a source of direct current voltage across the inputs of the discriminators 64 and 64A. The switch 120 has a pair of contacts 111 and another pair of contacts 112 adapted for cooperation with switch arms 113 and 114. Also the switch 120 has corresponding pairs of contacts 115 and 116 adapted to be connected to the discriminator 64A. The switch 120 with its arrangement of contacts permits selecting the polarity to be applied to the discriminators thus enabling the gyro to be driven off vertical in any direction.

Various components such as biasing resistors, by-pass capacitors and the like, which are conventional, have not been described in detail, as it is believed that their functions are well known to those skilled in the art.

Although only one embodiment of the invention has been illustrated and described in detail, it is to be expressly understood that the invention is not limited thereto, and various changes can be made in the design and arrangement of the parts without departing from the spirit and scope of the invention as the same will now be understood by those skilled in the art.

What is claimed is:

1. An erection system for a gyroscope provided with precessing erection means, comprising an inductive element and a support arranged for mounting on the gyroscope, a flexible suspension member carried by the support, a control mass of magnetic metal pendulously suspended by said member in the magnetic field of the inductive element in position to vary the reluctance of said field upon deviation of the gyroscope spin axis from a reference axis, and control means responsive to said variations for actuating the precessing means and thereby correcting said deviation.

2. An erection system for a gyroscope provided with precessing erection means, comprising an inductive element and a support arranged for mounting on the gyroscope, a suspension chain carried by the support, a control mass of magnetic metal pendulously suspended by said chain in the magnetic field of the inductive element in position to vary the reluctance of said field upon deviation of the gyroscope spin axis from a reference axis, and control means responsive to said variation for actuating the precessing means and thereby correcting said deviation.

3. An erection system for a gyroscope provided with precessing erection means, comprising an inductive element and a support arranged for mounting on the gyroscope, a chain attached to the support, a control mass of magnetic metal pendulously suspended by said chain in the magnetic field of the inductive element in position to vary the reluctance of said field upon deviation of the gyroscope spin axis from a reference axis, a kink-preventing enclosure extending around and adjacent to said chain, and control means responsive to said variation for actuating the precessing means and thereby correcting said deviation.

4. An erection system for a gyroscope provided with precessing erection means, comprising an inductive element and a support arranged for mounting on the gyroscope, a chain attached to the support, a control mass of magnetic metal pendulously suspended by said chain in the magnetic field of the inductive element in position to vary the reluctance of said field upon deviation of the gyroscope spin axis from a reference axis, a tubular restraining member extending around and adjacent to the chain from a point adjacent to the attachment to said support for a major proportion of the chain length in position to prevent the chain from kinking, and control means responsive to said variation for actuating the precessing means and thereby correcting said deviation.

5. An erection system for a gyroscope provided with precessing erection means, comprising an inductive element and a support arranged for mounting on the gyroscope, a suspension chain attached to the support, a control mass of magnetic metal pendulously suspended by said chain in the magnetic field of the inductive element in position to vary the reluctance of said field upon deviation of the gyroscope spin axis from a reference axis, and an abutment located in line with said mass between the mass and the point of chain attachment to the support in position to restrain the mass against excessive movement along the line of suspension, said abutment having an aperture smaller than said mass extending around the chain.

6. An erection system for a gyroscope provided with precessing erection means, comprising two pairs of inductors, each pair being axially aligned at opposite sides of a central zone at right angles to the other pair, arranged for alignment of one pair with the pitch axis and the other pair with the roll axis of a craft, a support for said inductors arranged for mounting on the gyroscope, a flexible suspension member carried by the support, a control mass of magnetic metal pendulously suspended by said member in the magnetic fields of the inductors and normally symmetrically positioned between each pair of inductors when the gyroscope spin axis is in alignment with the reference axis, arranged to vary the reluctance of the fields of at least one of said pairs of inductors upon deviation of the gyroscope spin axis from said reference axis, and control means responsive to said variation for actuating the precessing means and thereby correcting said deviation.

7. An erection system for a gyroscope provided with precessing erection means, comprising a support arranged for mounting on the gyroscope, two pairs of inductors mounted on the support symmetrically about an axis, each pair of inductors being oppositely wound and axially aligned at opposite sides of said axis at right angles to the other pair, arranged for alignment of one pair with the pitch axis and the other pair with the roll axis of a craft, a mounting member on the support extending along the axis between the inductors, a flexible suspension member attached at one end to the mounting member on said axis beyond the inductors, a control mass of magnetic metal attached to the other end of the flexible member in the magnetic fields of said inductors, said mass being axially aligned with and extending adjacent to said inductors, and being symmetrically located with respect thereto when the spin axis of the gyroscope is in alignment with a reference axis, arranged for variation of the magnetic fields of at least one pair of inductors upon deviation of the gyroscope spin axis from said reference axis, and control means responsive to said variation for actuating the precessing means and thereby correcting said deviation.

8. An erection system for a gyroscope provided with precessing erection means, comprising a support arranged for mounting on the gyroscope, a transformer unit comprising an annular primary winding mounted on the support symmetrically about a central axis and two pairs of secondary windings offset along said axis from the primary winding and having axes normal to said central axis, each pair of secondary windings being oppositely wound and axially aligned at opposite sides of said central axis at right angles to the other pair, a tubular mounting on the support extending between and beyond said secondary windings and adapted to contain a damping liquid, a suspension chain attached at one end to the mounting on said central axis, a control mass of magnetic metal attached to the other end of the chain, located within the mounting and in axial alignment with the secondary windings, being symmetrically located with respect thereto when the spin axis of the gyroscope is in alignment with the reference axis, a kink-preventing tubular member on said mounting extending from the point of chain connection to the mounting for the major proportion of the chain length, an abutment member carried by the mounting and extending inwardly above and slightly spaced from the mass when said central axis is vertical, said abutment member having a central opening extending around and spaced from the chain and smaller in diameter than said mass, arranged to permit movement of said mass and resulting variation in the reluctance of the magnetic fields of at least one pair of secondary windings when the gyroscope spin axis deviates from said reference axis, and control means responsive to said variation for actuating the precessing means and thereby correcting said deviation.

9. An erection system for a gyroscope provided with precessing erection means, comprising an inductive element arranged for mounting on the gyroscope, a mass of magnetic metal mounted in the magnetic field of said element for movement in accordance with deviations of the gyroscope spin axis from a reference axis and corresponding variation of the reluctance of the magnetic circuit of said element, a control circuit including means responsive to said magnetic circuit variations for actuating the precessing means to correct said deviations, first means for automatically initiating operation of said precessing means, second means for thereafter reducing the precession rate, and means to render said first and second means effective after predetermined periods following a starting of operation of the gyroscope.

10. An erection system for a gyroscope provided with precessing erection means, comprising an inductive element arranged for mounting on the gyroscope, a mass of magnetic metal mounted in the magnetic field of said element for movement in accordance with deviations of the gyroscope spin axis from a reference axis and corresponding variation of the reluctance of the magnetic circuit of said element, a control circuit including means responsive to said magnetic circuit variations for actuating the precessing means to correct said deviations, means for initiating operation of said precessing means after starting of operation of the gyroscope, and means including a time delay relay for automatically reducing the precession rate after a predetermined period following the starting of the gyroscope.

11. An erection system for a gyroscope provided with precessing erection means, comprising an inductive element arranged for mounting on the gyroscope, a control mass of magnetic metal mounted in the magnetic field of said element for movement in accordance with deviations of the gyroscope spin axis from a reference axis and corresponding variation of the reluctance of the magnetic circuit of said element, a control circuit including means for generating a deviation signal corresponding to said reluctance variation, means for initially actuating the precessing means to correct such deviations including a time delay relay and an operating relay responsive to said signal, and means for automatically reducing the precession rate after predetermined period following the initial actuation of the precessing means, said last-mentioned means including another time delay relay controlled by said first mentioned time delay relay.

12. An erection system for a gyroscope provided with precessing erection means, comprising an inductive element arranged for mounting on the gyroscope, a mass of magnetic metal mounted in the magnetic field of said element for movement in accordance with deviations of the gyroscope spin axis from a reference axis and corresponding variation of the reluctance of the magnetic circuit of said element, and a control circuit including means responsive to said magnetic circuit variations for generating an A. C. signal, means for rectifying the signal, means for intergrating the rectified signal, an operating relay actuated by the integrated signal, circuit means energized by the operating relay and including a first time delay element for initially actuating the precessing erection means to correct the deviation, and means for automatically reducing the precession rate after a predetermined period following a starting of operation of the gyroscope, comprising a second time delay element controlled by the first time delay element and means responsive to the operation of the second time delay element for inserting a precession rate reducing element in said circuit means.

13. An erection system for a gyroscope provided with precession erection means, comprising an inductive device arranged for mounting on the gyroscope, means for inducing an electrical signal in said inductive device in accordance with deviations of the gyroscope spin axis from a reference axis, a control network including means responsive to said signal for actuating the precessing means to correct said deviation, first control means for initiating operation of said precessing means, second conrtol means to reduce the precessing rate of said precessing means, and time delay means to render said first and second control means operative after predetermined periods following a starting of operation of the gyroscope.

14. The combination defined by claim 13 in which said time delay means includes a first time delay relay to render said first control means effective to initiate operation of said precessing means after a first predetermined period following the starting of operation of the gyroscope, and a second time delay relay rendered operative by said first control means to render said second control means effective to reduce the precessing rate upon the expiration of a second predetermined period.

References Cited in the file of this patent

UNITED STATES PATENTS

| | | |
|---|---|---|
| 2,516,912 | Reichel et al. | Aug. 1, 1950 |
| 2,553,268 | Noxon et al. | May 15, 1951 |
| 2,588,607 | Barkalow | Mar. 11, 1952 |

FOREIGN PATENTS

| | | |
|---|---|---|
| 597,282 | Great Britain | Jan. 22, 1948 |
| 633,942 | Great Britain | Dec. 30, 1949 |